US012362579B2

(12) United States Patent
Jin et al.

(10) Patent No.: US 12,362,579 B2
(45) Date of Patent: Jul. 15, 2025

(54) POWER SUPPLY APPARATUS, HEALTH MONITORING METHOD THEREFOR, AND STORAGE SYSTEM INCLUDING THE SAME

(71) Applicant: SK hynix Inc., Icheon (KR)

(72) Inventors: Su Il Jin, Icheon (KR); In Bo Shim, Icheon (KR); Won Seob Song, Icheon (KR); Jin Yeon Won, Icheon (KR)

(73) Assignee: SK hynix Inc., Icheon-si (KR)

( * ) Notice: Subject to any disclaimer, the term of this patent is extended or adjusted under 35 U.S.C. 154(b) by 446 days.

(21) Appl. No.: 18/048,819

(22) Filed: Oct. 21, 2022

(65) Prior Publication Data

US 2023/0378787 A1 Nov. 23, 2023

(30) Foreign Application Priority Data

May 18, 2022 (KR) ........................ 10-2022-0060696

(51) Int. Cl.
*H02J 7/00* (2006.01)

(52) U.S. Cl.
CPC .......... *H02J 7/005* (2020.01); *H02J 7/00032* (2020.01); *H02J 7/007182* (2020.01); *H02J 2207/50* (2020.01)

(58) Field of Classification Search
CPC .. H02J 7/005; H02J 7/00032; H02J 7/007182; H02J 2207/50
USPC ........................................................ 340/636.2
See application file for complete search history.

(56) References Cited

U.S. PATENT DOCUMENTS

2005/0035741 A1* 2/2005 Elder ................ H01M 10/0413 320/116
2008/0036421 A1* 2/2008 Seo ....................... B60W 10/06 320/132
2020/0212512 A1* 7/2020 Kwon ................. H01M 10/486
2020/0372726 A1* 11/2020 Palaj ...................... B64D 45/00
2021/0012842 A1* 1/2021 Ryu ....................... G11C 5/143

FOREIGN PATENT DOCUMENTS

KR 10-2019-0062032 A 6/2019
KR 10-2035679 B1 10/2019

* cited by examiner

*Primary Examiner* — Kerri L McNally

(57) ABSTRACT

A power supply apparatus may include a charging circuit configured to receive an external voltage and to generate a charging voltage by charging and discharging energy by switching according to a level of the charging voltage; an auxiliary power circuit configured to store an electric charge using the charging voltage; and a health monitoring circuit configured to determine a charging health state of the auxiliary power circuit by counting a number of switchings of the charging circuit during an interval in which the charging voltage rises to a first level from a second level, the determined charging health state being based on the number of switchings.

25 Claims, 10 Drawing Sheets

POWER SUPPLY APPARATUS, HEALTH MONITORING METHOD THEREFOR, AND STORAGE SYSTEM INCLUDING THE SAME

CROSS-REFERENCES TO RELATED APPLICATION

The present application claims priority under 35 U.S.C. § 119(a) to Korean application number 10-2022-0060696, filed on May 18, 2022, in the Korean Intellectual Property Office, which is incorporated herein by reference in its entirety.

BACKGROUND

1. Technical Field

The present technology relates to an electronic apparatus, and more particularly, to a power supply apparatus, a health monitoring method therefor, and a storage system including the same.

2. Related Art

An electronic apparatus operates by receiving power supplied from an exterior source. A sudden power off (SPO) situation may occur in which power is suddenly cut off while the electronic apparatus is operating. When the SPO occurs, the electronic apparatus may not successfully complete an operation being performed.

To this end, the electronic apparatus may cope with the SPO situation by using an auxiliary power supply apparatus. Accordingly, when the auxiliary power supply apparatus does not operate normally, the reliability of the electronic apparatus may not be guaranteed.

SUMMARY

A power supply apparatus according to an embodiment of the present technology may include: a charging circuit configured to receive an external voltage and to generate a charging voltage by charging and discharging energy by switching according to a level of the charging voltage; an auxiliary power circuit configured to store an electric charge using the charging voltage; and a health monitoring circuit configured to determine a charging health state of the auxiliary power circuit by counting a number of switchings of the charging circuit during an interval in which the charging voltage rises to a first level from a second level, the determined charging health state being based on the number of switchings.

A power supply apparatus according to an embodiment of the present technology may include: a power loss protection circuit configured to output operating power by selecting one of a charging voltage and an external voltage; a power management circuit configured to generate an internal voltage on the basis of the operating power; a charging circuit configured to receive the external voltage and to generate a charging voltage by charging and discharging energy by switching according to a level of the charging voltage; an auxiliary power circuit configured to store an electric charge on the basis of the charging voltage; and a health monitoring circuit configured to determine a charging health state of the auxiliary power circuit by counting a number of switchings of the charging circuit during an interval in which the charging voltage reaches a first level from a second level, the determined charging health state being based on the number of switchings.

A storage system according to an embodiment of the present technology may include: at least one memory apparatus; a controller configured to exchange data with the memory apparatus in response to an external request; and a power supply apparatus configured to supply the memory apparatus and the controller with an internal voltage generated on the basis of an external voltage, the power supply apparatus including: a charging circuit configured to receive the external voltage and to generate a charging voltage by charging and discharging energy by switching according to a level of the charging voltage, an auxiliary power circuit configured to store an electric charge on the basis of the charging voltage, and a health monitoring circuit configured to determine a charging health state of the auxiliary power circuit by counting a number of switchings of the charging circuit during an interval in which the charging voltage rises to a first level from a second level, the determined charging health state being based on the number of switchings.

A health monitoring method for a power supply apparatus according to an embodiment of the present technology may include: generating, by a power supply apparatus, a charging voltage by charging and discharging energy by switching according to a level of the charging voltage; storing an electric charge in an auxiliary power circuit on the basis of the charging voltage; and determining a charging health state of the auxiliary power circuit by counting a number of switchings of the power supply apparatus during an interval in which the charging voltage rises to a first level from a second level, the determined charging health state being based on the number of switchings.

DETAILED DESCRIPTION

Hereinafter, embodiments of the present technology will be described in more detail with reference to the accompanying drawings.

Figure 1:
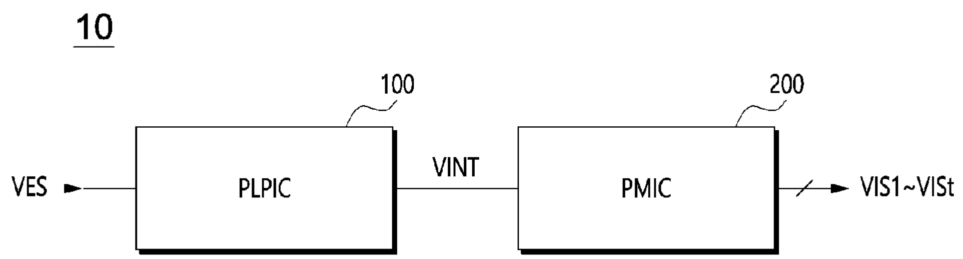
FIG. 1 illustrates a power supply apparatus in accordance with an embodiment.

FIG. 1 is a configuration diagram of a power supply apparatus 10 in accordance with an embodiment.

The power supply apparatus 10 may include a power loss protection circuit (PLPIC) 100 and a power management circuit (PMIC) 200.

The PLPIC 100 may be configured to substantially prevent loss of power supplied to an electronic apparatus including the power supply apparatus 10. In an embodiment, the PLPIC 100 may be configured to receive an external power supply voltage VES and generate operating power VINT. The operating power VINT may be selected from the external power supply voltage VES or from a charging voltage provided from an auxiliary power supply apparatus provided in the PLPIC 100.

A detailed description of the auxiliary power supply apparatus will be described below with reference to FIG. 2 to FIG. 5.

The PMIC 200 may convert the voltage level of the operating power VINT to generate a plurality of internal voltages VIS1 to VISt respectively having the same level or different levels. The plurality of internal voltages VIS1 to VISt may be respectively supplied to a plurality of internal circuits constituting the electronic apparatus.

Figure 2:
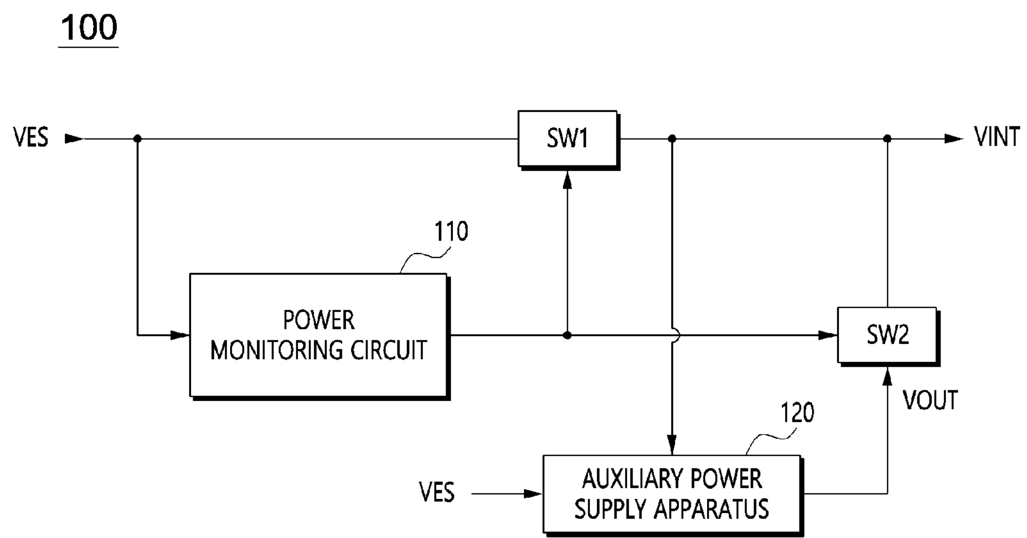
FIG. 2 illustrates a power loss protection circuit in accordance with an embodiment.

FIG. 2 is a configuration diagram illustrating the PLPIC 100 in accordance with an embodiment.

The PLPIC 100 may include a power monitoring circuit 110, a first switch SW1, an auxiliary power supply apparatus 120, and a second switch SW2.

The power monitoring circuit 110 may be configured to control the first switch SW1 and the second switch SW2 by sensing the level of the external power supply voltage VES. When the external power supply voltage VES is normally supplied, the power monitoring circuit 110 may turn on the SW1, turn off the SW2, and output the external power supply voltage VES as the operating power VINT.

The auxiliary power supply apparatus 120 may be charged by receiving the external power supply voltage VES.

When the external power supply voltage VES is abnormally supplied or not supplied, the power monitoring circuit 110 may turn off the first switch SW1, turn on the second switch SW2, and output a charging voltage VOUT of the auxiliary power supply apparatus 120 as the operating power VINT.

Figure 3:
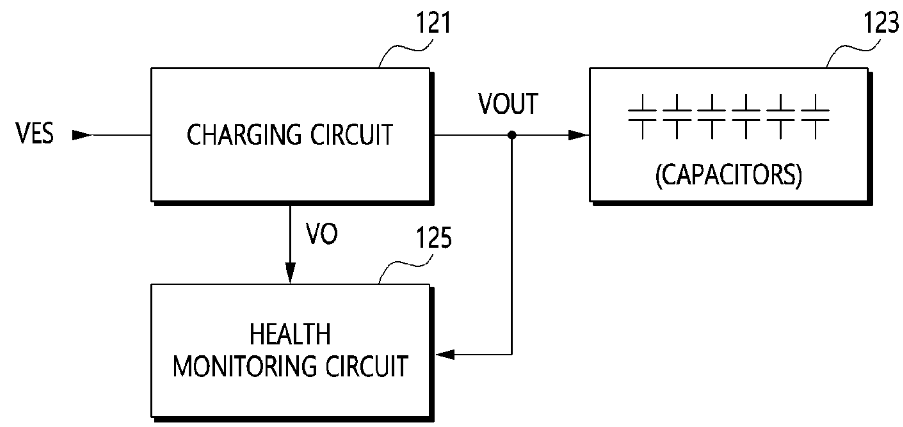
FIG. 3 illustrates an auxiliary power supply apparatus in accordance with an embodiment.

FIG. 3 is a configuration diagram illustrating the auxiliary power supply apparatus 120 in accordance with an embodiment.

The auxiliary power supply apparatus 120 may include a charging circuit 121, an auxiliary power circuit 123, and a health monitoring circuit 125.

The charging circuit 121 may receive energy from the external power supply voltage VES and use that energy to output the charging voltage VOUT. In one embodiment, the charging circuit 121 may be include a DC-DC converter.

In an embodiment, the charging circuit 121 may include a switch that is turned on or off by a control signal VO generated on the basis of the charging voltage VOUT. The charging circuit 121 may be configured to generate the charging voltage VOUT by performing at least once a charging/discharging cycle of charging an energy storage element with energy when the switch is in a first switching state and discharging the energy when the switch is in a second switching state. A detailed description of the charging circuit 121 will be described below with reference to FIG. 4.

The auxiliary power circuit 123 includes, for example, a plurality of capacitors connected in parallel, and may be charged on the basis of the charging voltage VOUT. The capacitors constituting the auxiliary power circuit 123 may be charged to a target level, for example, the level of the charging voltage VOUT, as the switch of the charging circuit 121 is switched according to the control signal VO.

The health monitoring circuit 125 may be configured to monitor the health state of the capacitors constituting the auxiliary power circuit 123 in real time.

In an embodiment, the health monitoring circuit 125 may determine the health state of the auxiliary power circuit 123 on the basis of at least the number of switchings of the switch of the charging circuit 121 that occur during an interval in which the level of the charging voltage VOUT is charged to the target level. A detailed description of the health monitoring circuit 125 will be described below with reference to FIG. 6 to FIG. 11.

Figure 4:
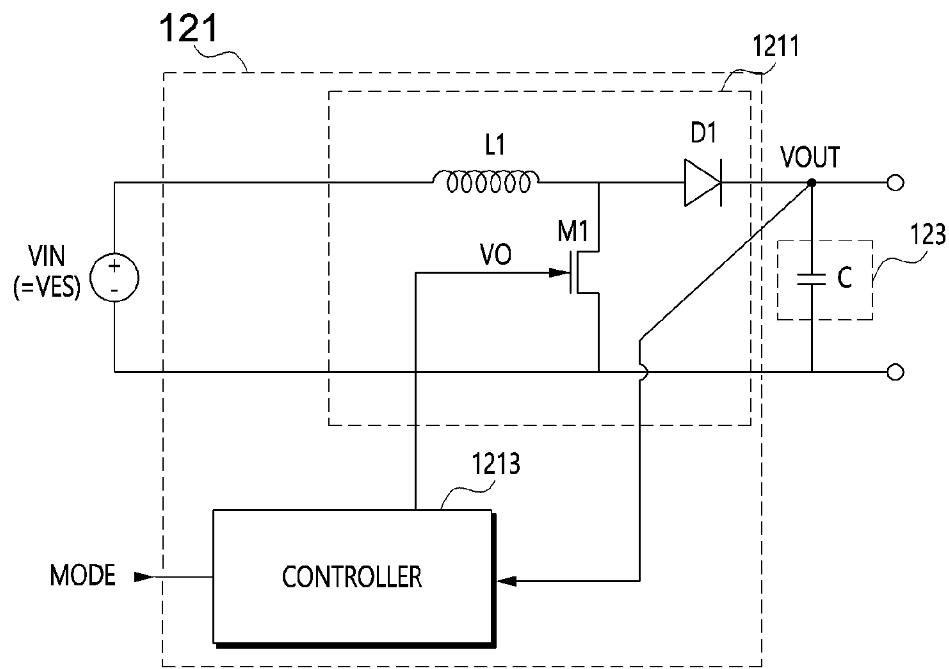
FIG. 4 illustrates a charging circuit in accordance with an embodiment.

FIG. 4 is a configuration diagram illustrating the charging circuit 121 in accordance with an embodiment.

The charging circuit 121 may include a converter 1211 and a controller 1213. The auxiliary power circuit 123 may be connected to an output terminal of the converter 1211.

The converter 1211 may be configured as a DC-DC boost converter or a step-up converter including an inductor L1 as an energy storage element, a switch M1, and a diode D1, but embodiments are not limited thereto.

When the switch M1 is turned on by the control signal VO, a current according to the external power supply voltage VES (that is, input power VIN) is applied to the inductor L1, so that energy is accumulated in the inductor L1. At this time, the voltage across the inductor L1 has substantially the same level as that of the external power supply voltage VES.

When the switch M1 is turned off, the energy accumulated in the inductor L1 as well as energy from the external power supply voltage VES is transferred through the diode D1 so that the charging voltage VOUT having a higher level than the external power supply voltage VES is generated.

The charging voltage VOUT may be supplied to the auxiliary power circuit 123, so that the capacitor C therein may be charged.

The controller 1213 may be configured to determine the control signal VO for controlling the switch M1 by detecting the level of the charging voltage VOUT and according to a mode signal MODE. The mode signal MODE may be generated to selectively enable, for example, a power save mode (PSM) or a test mode (TM), but is not limited thereto.

In an embodiment, when the power save mode PSM is enabled, the controller 1213 may detect the level of the charging voltage VOUT and generate the control signal VO so that the switch M1 is turned on or off. For example, when the switch M1 is turned off, the auxiliary power circuit 123 is charged, and the level of the charging voltage VOUT rises to a first target level VH. In response to the charging voltage VOUT rising to the first target level VH, the controller 1213 may stop charging the auxiliary power circuit 123 by generating the control signal VO so that the switch M1 is turned on. When the switch M1 is turned on, the auxiliary power circuit 123 is naturally discharged (for example, by leakage currents) and the level of the charging voltage VOUT drops to a second target level VL lower than the first target level VH. In response to the charging voltage VOUT dropping to the second target level VL, the controller 123 may generate the control signal VO so that the switch M1 is turned off, so that the auxiliary power circuit 123 may be recharged.

When the test mode TM is enabled, the controller 1213 may generate the control signal VO so that the auxiliary power circuit 123 is discharged, that is, the switch M1 is turned on.

Figure 5:
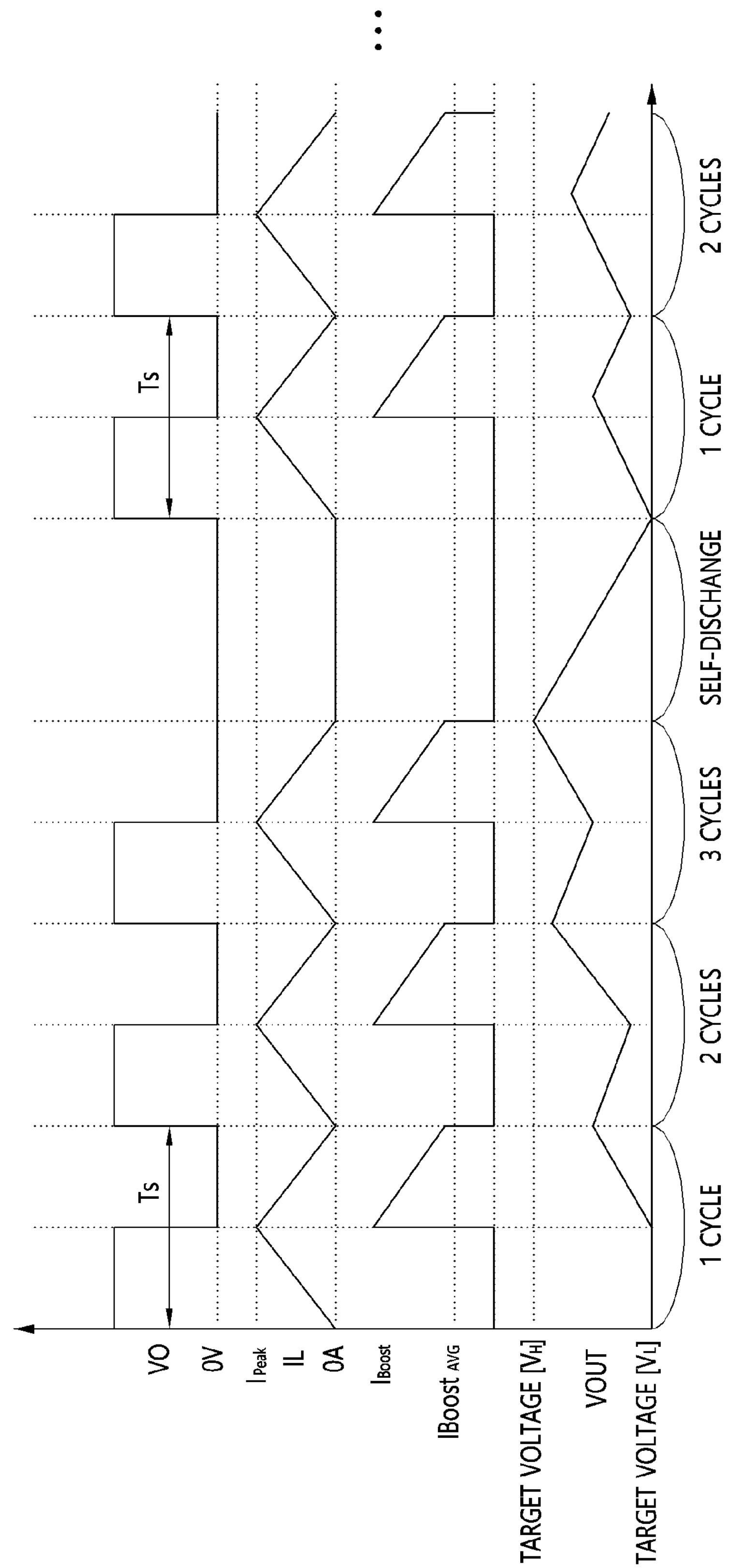
FIG. 5 is a timing diagram illustrating an operation of the charging circuit in accordance with an embodiment.

FIG. 5 is a timing diagram for explaining an operation of the charging circuit 121 in accordance with an embodiment.

The controller 1213 may generate the control signal VO to turn the switch M1 on and off at a constant cycle time Ts according to the level of the charging voltage VOUT.

In a turn-on period of the switch M1 in which the level of the control signal VO has a logic high level, energy is accumulated in the inductor and an inductor current IL gradually rises. At this time, since no current flows toward the diode D1, an average charging current $IBoost_{AVG}$ is not generated and the charging voltage VOUT of the auxiliary power circuit 123 does not increase.

When the switch M1 is turned off (that is, when the control signal VO has a logic low level), as a current flows in the direction of the diode D1, the current of the inductor IL gradually decreases, and the average charging current $IBoost_{AVG}$ of the auxiliary power circuit 123 increases momentarily and then decreases gradually.

As a result of the current flowing through the diode D1, the charging voltage VOUT gradually rises, and as the switching cycle of the switch M1 is repeated, the charging voltage VOUT reaches a high target level VH (in the illustrated example, after three switching cycles).

For example, as illustrated in FIG. 5, when the charging voltage VOUT of the auxiliary power circuit 123 reaches the high target level VH through three switching cycles, self-discharge is caused by turning off the switch M1 by the control signal VO until the charging voltage VOUT reaches a low target level VL.

As described above, the charging operation of the charging circuit 121 may be performed through at least one switching cycle having a constant cycle time Ts. When the state of the auxiliary power circuit 123 is normal, the charging voltage VOUT may reach the high target level VH after a number of switching cycle within a predetermined range. However, in a case where the state of the auxiliary power circuit 123 is abnormal, for example, when a failure such as a short or open occurs in one or more of the capacitors included in the auxiliary power circuit 123, the charging operation of the charging circuit 121 may have a different aspect compared to when the state of the auxiliary power circuit 123 is normal.

Accordingly, the health monitoring circuit 125 may determine the state of the auxiliary power circuit 123 by analyzing the operation of the charging circuit 121. For example, the health monitoring circuit 125 may determine the health state of the auxiliary power circuit 123 on the basis of at least the number of switching cycles of the switch M1 that occur while the level of the charging voltage VOUT is charged to a target level, that is, to the high target level VH.

Figure 6:
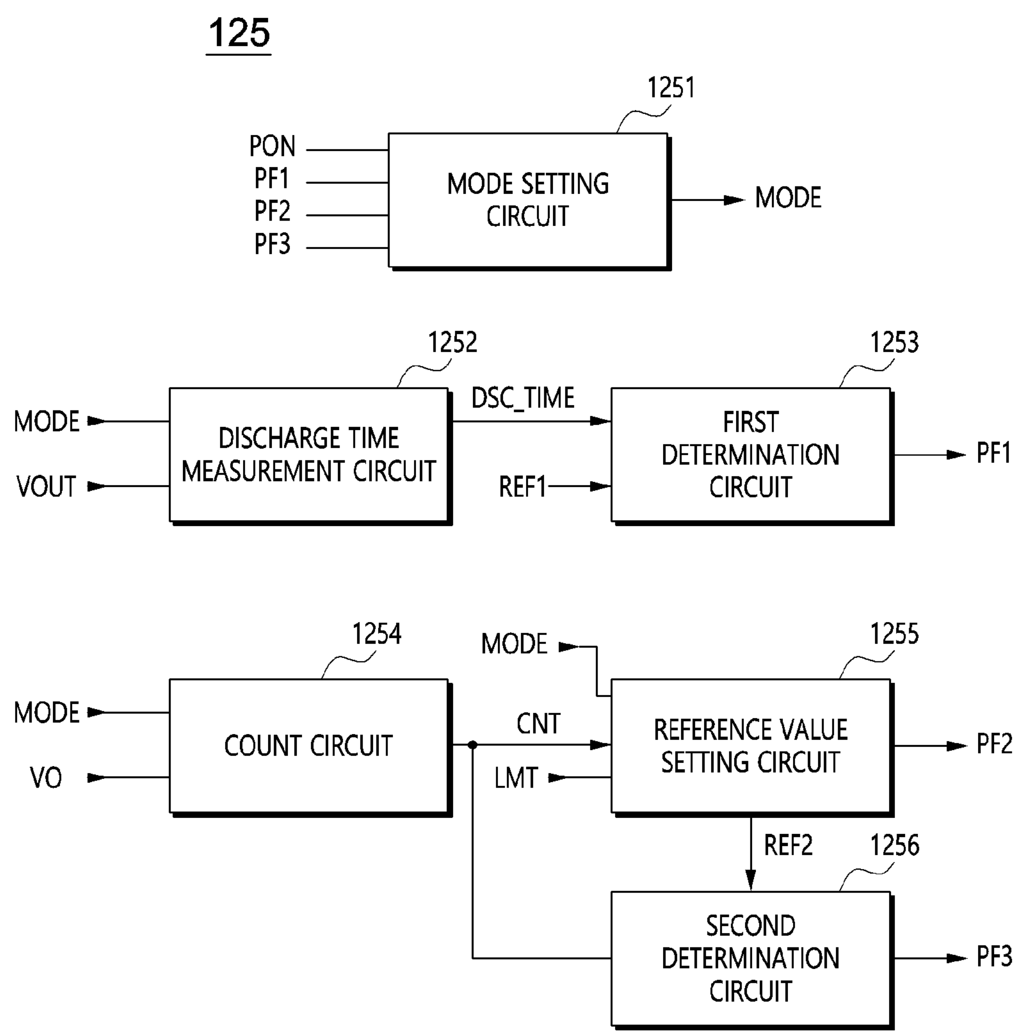
FIG. 6 illustrates a health monitoring circuit in accordance with an embodiment.

FIG. 6 is a configuration diagram illustrating the health monitoring circuit 125 in accordance with an embodiment.

In describing the health monitoring circuit 125 illustrated in FIG. 6, the PLPIC 100 illustrated in FIG. 2 to FIG. 4 may be referred to.

Referring to FIG. 6, the health monitoring circuit 125 may include a mode setting circuit 1251, a discharge time measurement circuit 1252, a first determination circuit 1253, a count circuit 1254, a reference value setting circuit 1255, and a second determination circuit 1256.

The mode setting circuit 1251 may be configured to generate the mode signal MODE in response to a power-on signal PON, a first determination signal PF1, a second determination signal P2F, and a third determination signal PF3. The mode signal MODE may be a signal for selectively enabling or disabling a normal mode NM, a test mode TM, the power save mode PSM, a health monitoring mode HMM, a fail mode FM, or combinations thereof. The normal mode NM may be a mode in which the test mode TM, the power save mode PSM, the health monitoring mode HMM, and the fail mode FM are disabled.

The discharge time measurement circuit 1252 may operate according to the mode signal MODE indicating enabling of the test mode TM after the power supply apparatus 10 is powered on, and may receive the charging voltage VOUT, measure a discharge time required for the level of the charging voltage VOUT to drop from a preset start voltage Vstart to a stop voltage Vstop, and output a discharge time measurement signal DSC_TIME indicating the measured discharge time. While the discharge time measurement circuit 1252 is measuring the discharge time, the controller 1213 may generate the control signal VO so that the charging of the auxiliary power circuit 123 is stopped.

The first determination circuit 1253 may compare the discharge time measurement signal DSC_TIME with a first reference value REF1 to determine a first health state of the auxiliary power supply apparatus 120, particularly of the auxiliary power circuit 123, and output a first determination signal PF1. The first health state may be referred to as a discharging health state.

For example, when the discharge time measurement signal DSC_TIME is greater than the first reference value REF1, the first determination circuit 1253 may determine that the first health state of the auxiliary power circuit 123 is normal, and output the first determination signal PF1 having a level indicating that the first health state of the auxiliary power circuit 123 is normal. In response to the first determination signal PF1 indicating that the first health state is normal, the mode setting circuit 1251 may generate the mode signal MODE indicating enabling of the power save mode PSM and the health monitoring mode HMM.

When the discharge time measurement signal DSC_TIME is equal to or less than the first reference value REF1, the first determination circuit 1253 may determine that the first health state of the auxiliary power circuit 123 is abnormal, and output the first determination signal PF1 having a level indicating that the first health state of the auxiliary power circuit 123 is abnormal. The mode setting circuit 1251 may generate the mode signal MODE indicating enabling of the fail mode FM in response to the first determination signal PF1 indicating that the first health state is abnormal.

The count circuit 1254 may operate according to the mode signal MODE enabling the power save mode (PSM) and the health monitoring mode (HMM), and may receive the control signal VO to count the number of switching cycles of the control signal VO, and output a count signal CNT.

The reference value setting circuit 1255 may operate according to the mode signal MODE enabling the test mode TM, and may compare the count signal CNT with an allowable value LMT, and output a second reference value REF2 and the second determination signal PF2. The allowable value LMT may be set to have a range between a lower limit allowable value and an upper limit allowable value, but is not limited thereto.

For example, when the count signal CNT falls within the range of the allowable value LMT, the reference value setting circuit 1255 may generate a switching reference value for the switch M1 as the second reference value REF2, and generate the second determination signal PF2 having a level indicating that the second reference value REF2 has been normally generated. In an embodiment, the second reference value REF2 may be set to have a range equal to or smaller than the range of the allowable value LMT.

In response to the second determination signal PF2 indicating that the second reference value REF2 has been normally generated, the mode setting circuit 1251 may generate the mode signal MODE indicating that the power save mode (PSM) and the health monitoring mode (HMM) substantially maintain enabled states and the test mode TM is disabled.

When the count signal CNT does not fall within the range of the allowable value LMT, the reference value setting circuit 1255 may not generate the second reference value REF2 and may generate the second determination signal PF2 having a level indicating that generation of the second reference value REF2 has failed.

In response to the second determination signal PF2 indicating that the generation of the second reference value REF2 has failed, the mode setting circuit 1251 may generate the mode signal MODE indicating enabling of the fail mode FM.

The second determination circuit 1256 may determine a second health state of the auxiliary power circuit 123 on the basis of the count signal CNT and the second reference value REF2 to output the third determination signal PF3. The second health state may be referred to as a charging health state.

For example, when the count signal CNT falls within the range of the second reference value REF2, the second determination circuit 1256 may determine that the second health state of the auxiliary power circuit 123 is normal, and output the third determination signal PF3 having a level indicating that the second health state of the auxiliary power circuit 123 is normal.

In response to the third determination signal PF3 indicating that that the second health state is normal, the mode setting circuit 1251 may generate the mode signal MODE indicating that the enabled states of the power save mode PSM and the health monitoring mode HMM are substantially maintained.

When the count signal CNT does not fall within the range of the second reference value REF2, the second determination circuit 1256 may determine that the second health state of the auxiliary power circuit 123 is abnormal, and output the third determination signal PF3 having a level indicating that the second health state of the auxiliary power circuit 123 is abnormal.

In response to the third determination signal PF3 indicating that the second health state is abnormal, the mode setting circuit 1251 may generate the mode signal MODE indicating disabling of the power save mode PSM and the health monitoring mode HMM and enabling of the test mode TM.

The capacitance B.Cap Capacitance of the auxiliary power circuit 123 may be characterized by the following relationship:

$$B.Cap\ \text{Capacitance} = IBoost_{AVG} * \frac{(V_H - V_L)}{M1\ \text{Switching cycle}} \qquad \text{Equation 1}$$

In Equation 1 above, VH corresponds to the high target level VH, $V_L$ corresponds to the low target level VL, the M1 Switching Cycle corresponds to the number of switchings of the switch M1, and the average charging current $IBoost_{AVG}$ is expressed by the relationship of Equation 2 below.

$$IBoost_{AVG} = \frac{\left(\frac{1}{VIN} + \frac{1}{VOUT - VIN}\right) L * Ipeak^2 * VIN * \eta}{\square\ 2Ts * VOUT} \qquad \text{Equation 2}$$

In Equation 2 above, VIN denotes is an input voltage of the charging circuit 121 illustrated in FIG. 4, VOUT is a charging voltage, L is an inductance of the inductor L1, Ipeak is the maximum amount of current flowing through the inductor L1, and η is an efficiency coefficient relative to VIN.

As can be seen from Equation 1 above, the capacitance B.Cap Capacitance of the auxiliary power circuit 123 corresponds to the number of switchings of the switch M1 (that is, the number of M1 switching cycles) needed to increase the charging voltage VOUT from the low target level VL to the high target level VH.

The average charging current $IBoost_{AVG}$ may be calculated by Equation 2 above according to known values and applied to Equation 1 above. Therefore, it can be seen that, when the capacitance B.Cap Capacitance is changed in Equation 1 above, the number of switchings of the switch M1 needed to increase the charging voltage VOUT from the low target level VL to the high target level VH is changed.

Accordingly, the health state of the auxiliary power circuit 123 may be determined by monitoring the number of switchings of the switch M1.

Figure 7:
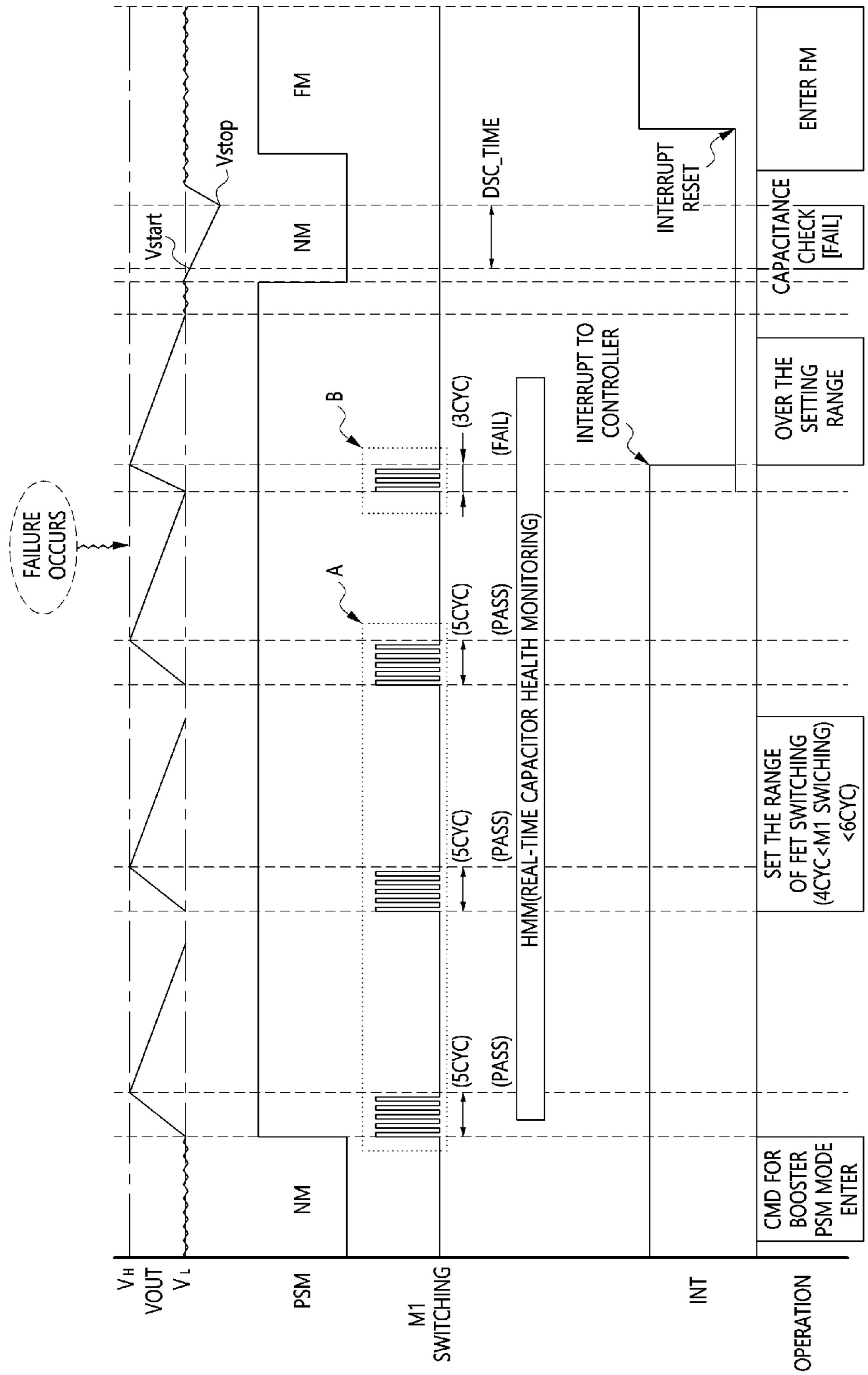
FIG. 7 is a timing diagram illustrating an operation of the health monitoring circuit in accordance with an embodiment.

FIG. 7 is a timing diagram illustrating operation of the health monitoring circuit 125 in accordance with an embodiment.

Referring to FIG. 2 to FIG. 7, the PLPIC 100 may switch from the normal mode NM to the power save mode PSM. The health monitoring mode HMM for monitoring the health state of the auxiliary power circuit 123 in real time may also be enabled together with the power save mode PSM.

Similarly to the description made with reference to FIG. 5, the controller 1213 may turn on/off the switch M1 in a plurality of cycles using the control signal VO, so that the auxiliary power circuit 123 may be charged to the high target level VH.

In a state in which the second reference value REF2, which is the switching reference value of the switch M1, is set to, for example, a range including 4, 5, and 6, when the number of switchings of M1 counted by the health monitoring circuit 125 as the charging voltage VOUT rose from the low target level VL to the high target level VH is 5 times (A), the health monitoring circuit 125 may determine that the charging health state of the auxiliary power circuit 123 is normal.

When a failure occurs in the auxiliary power circuit 123 at a specific moment, the number of switchings of the switch M1 needed to raise the charging voltage VOUT from the low target level VL to the high target level VH may change in accordance with the relationship indicated in Equation 1 and Equation 2 above. For example, after the failure occurs, the number of switchings may be counted as three times (B), and the health monitoring circuit 125 may therefore determine that the charging health state of the auxiliary power circuit 123 is abnormal and issue an interrupt signal INT.

When the charging health state is abnormal, the health monitoring circuit 125 may stop the charging of the charging circuit 121, and may measure the discharge time DSC_TIME required for the level of the charging voltage VOUT to drop from the level of the preset start voltage Vstart to the level of the stop voltage Vstop.

When the discharge time DSC_TIME is equal to or less than the preset first reference value REF1, the health monitoring circuit 125 may enable the fail mode FM to allow the PLPIC 100 to enter the fail mode FM.

FIG. 8 to FIG. 11 are flowcharts for explaining the operation of the health monitoring circuit 125 in accordance with an embodiment. In describing the health monitoring operation with reference to FIG. 8 to FIG. 11, FIG. 1 to FIG. 7 may be referenced again.

Figure 8:
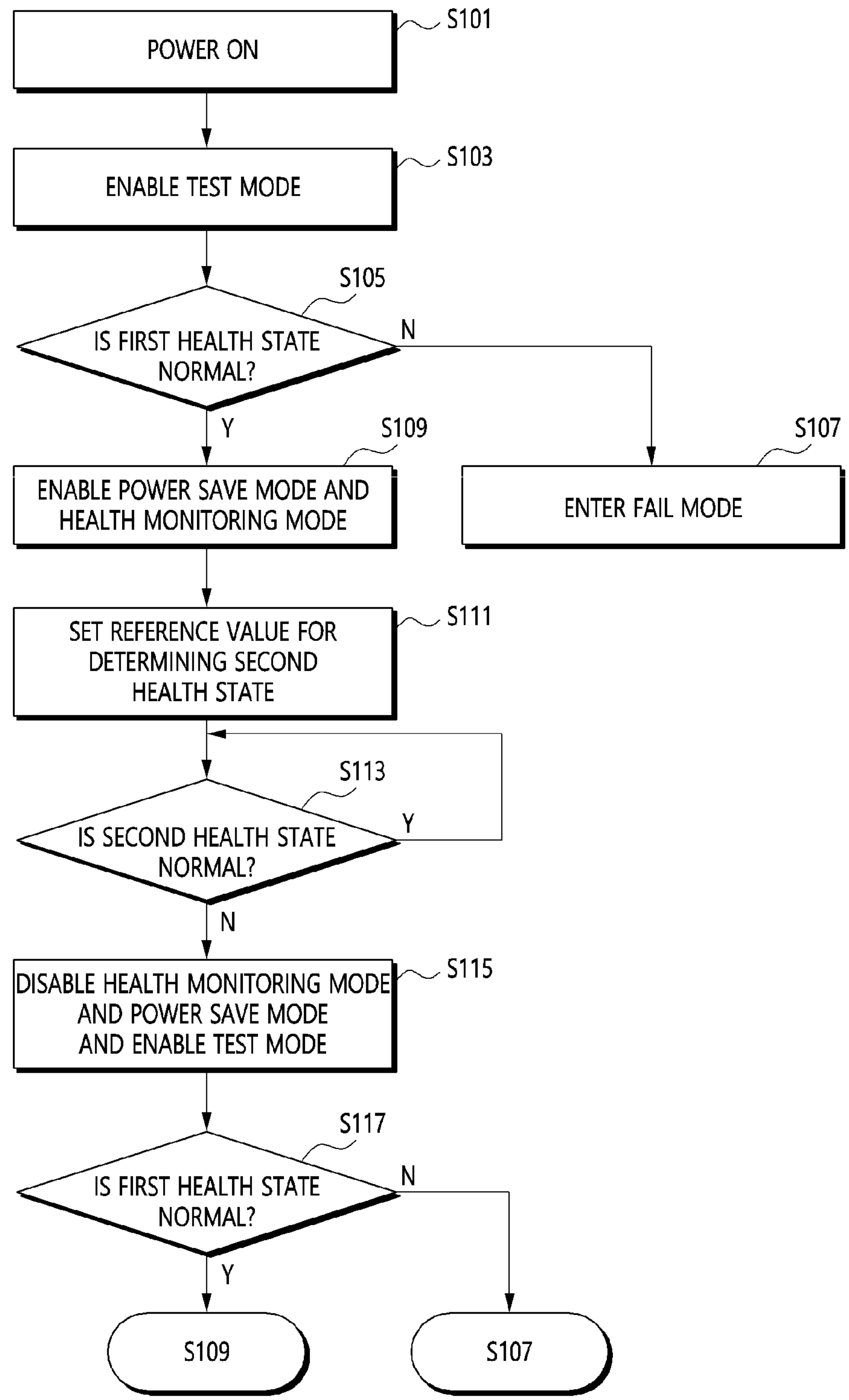
FIG. 8 to FIG. 11 are flowcharts illustrating operation of the health monitoring circuit in accordance with an embodiment.

Referring to FIG. 8, after the power supply apparatus 10 is powered on (S101), the test mode TM may be enabled (S103). As the test mode TM is enabled, charging of the auxiliary power circuit 123 may be stopped and stored energy may be discharged.

The health monitoring circuit 125 may determine whether the first health state of the auxiliary power circuit 123, for example, the discharging health state, is normal on the basis of the discharge time of the auxiliary power circuit 123 (S105).

Figure 9:
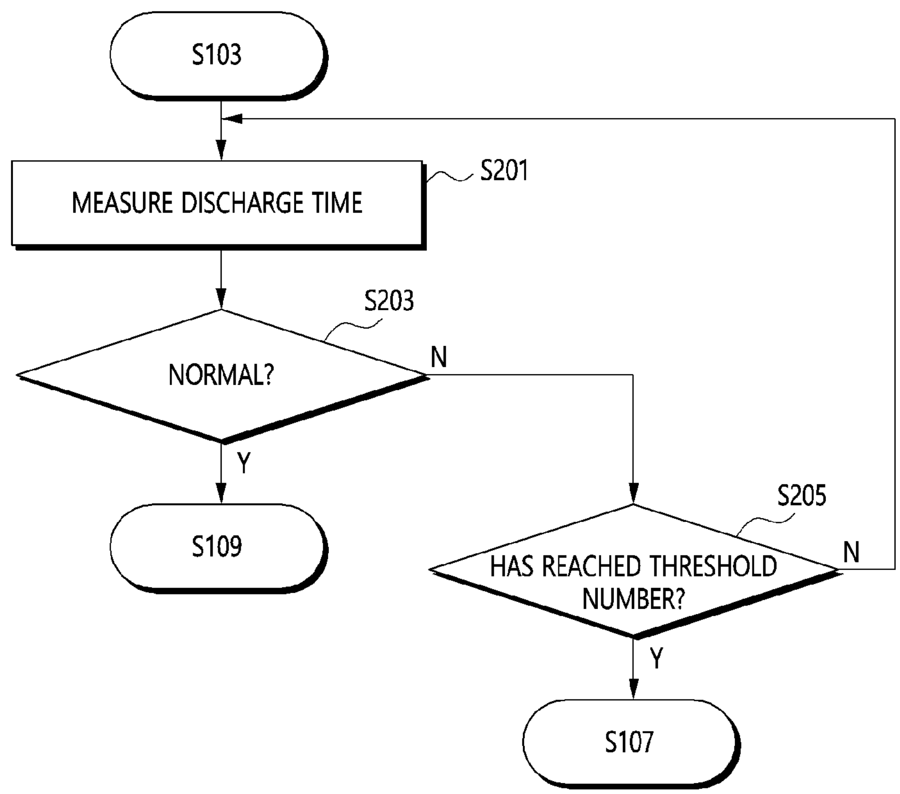

In order to determine the first health state of the auxiliary power circuit 123, for example, a health monitoring operation illustrated in FIG. 9 may be used.

Referring to FIG. 9, the health monitoring circuit 125 may receive the charging voltage VOUT, and measure the time required for the level of the charging voltage VOUT to drop from the level of the preset start voltage Vstart to the level of the stop voltage Vstop (S201). In embodiments, S201 may include charging the charging voltage VOUT up to the preset start voltage Vstart if necessary before measuring the time required for the level of the charging voltage VOUT to drop to the level of the stop voltage Vstop.

The health monitoring circuit 125 may compare the measured discharge time with the first reference value REF1 and determine whether the first health state of the auxiliary power circuit 123 is normal (S203).

When the discharge time is measured as the first reference value REF1 or smaller and it is determined that the first health state of the auxiliary power circuit 123 is abnormal (S203:N), the health monitoring circuit 125 may determine whether the number of measurements of the discharge time has reached a threshold number (S205).

When the number of measurements of discharge time has not reached the threshold number (S205:N), the health monitoring circuit 125 may measure the discharge time again (S201). When the number of measurements of discharge time has reached the threshold number (S205:Y), the health monitoring circuit 125 may allow the PLPIC 100 to operate in a fail mode (S107).

When the measured discharge time is greater than the first reference value REF1, the health monitoring circuit 125 may determine that the first health state of the auxiliary power circuit 123 is normal (S203: Y), and enable the power save mode PSM and the health monitoring mode HMM as illustrated in FIG. 8 (S109).

Referring to FIG. 8, when the first health state of the auxiliary power circuit 123 is abnormal (S105:N), the health monitoring circuit 125 may allow the PLPIC 100 to operate in the fail mode (S107). When the first health state of the auxiliary power circuit 123 is normal (S105: Y), the health monitoring circuit 125 may enable the power save mode PSM and the health monitoring mode HMM (S109).

When the power save mode PSM is enabled, the charging voltage VOUT of the auxiliary power circuit 123 may repeat an operation of rising to the preset high target level VH and then dropping to the low target level VL as a result of the switching operation of the switch M1.

The health monitoring circuit 125 may set a reference value for determining the second health state on the basis of the number of times that the switch M1 switches as the charging voltage VOUT rises from the low target level VL to the high target level VH (S111).

Figure 10:
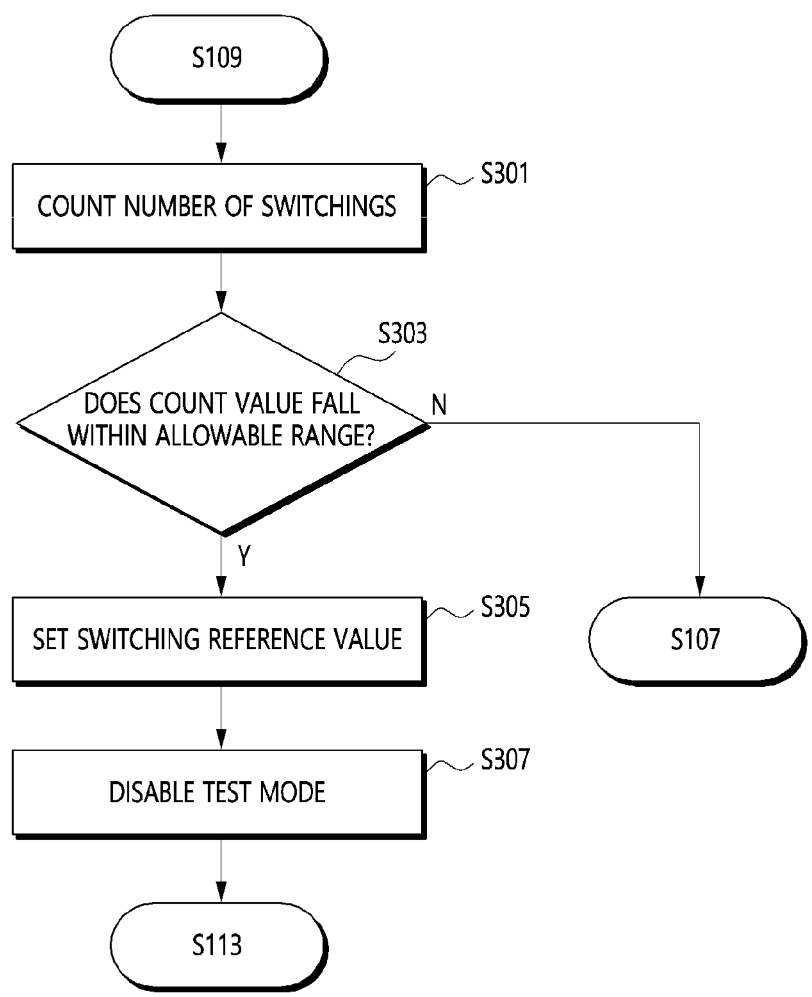

In order to set the reference value for determining the second health state, for example, an operation illustrated in FIG. 10 may be used.

Referring to FIG. 10, the health monitoring circuit 125 may count the number of times by which the switch M1 switches while the charging voltage VOUT rises from the low target level VL to the high target level VH (S301).

The health monitoring circuit 125 may check whether the count value CNT falls within the range of the preset allowable value LMT (S303). The allowable value LMT may be set within a range between the lower limit allowable value and the upper limit allowable value, but is not limited thereto.

When the count value CNT is out of the range of the allowable value LMT (S303:N), the health monitoring circuit 125 may allow the PLPIC 100 to operate in the fail mode (S107).

When the count value CNT falls within the range of the allowable value LMT (S303: Y), the health monitoring circuit 125 may set, based on the count value CNT, the second reference value REF2 to a range equal to or smaller than the range of the allowable value LMT as a reference value for determining the second health state (S305).

When the second reference value REF is set, the health monitoring circuit 125 may disable the test mode (S307), and check whether the second health state of the auxiliary power circuit 123 is normal as illustrated in FIG. 8 (S113). The second health state may be a charging health state.

Figure 11:
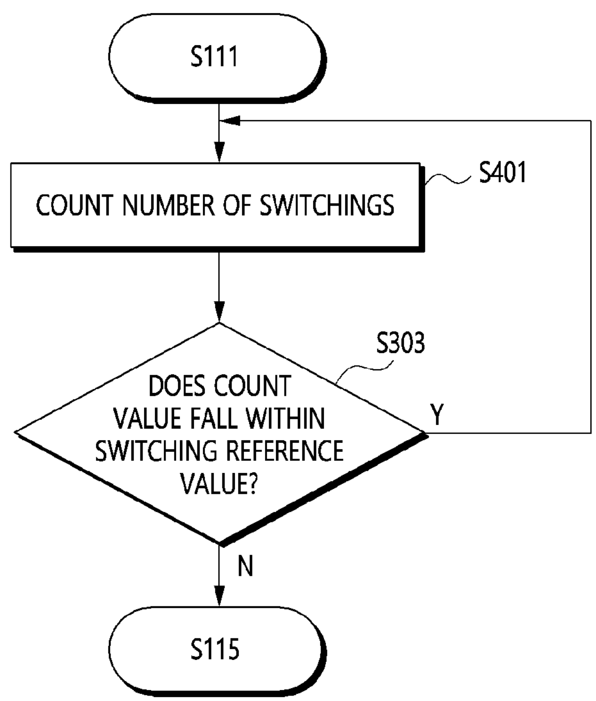

In order to check the second health state of the auxiliary power circuit 123, for example, an operation illustrated in FIG. 11 may be used.

Referring to FIG. 11, the health monitoring circuit 125 may count the number of times that the switch M1 switches while the charging voltage VOUT rises from the low target level VL to the high target level VH (S401).

The health monitoring circuit 125 may check whether the count value CNT falls within the range of the second reference value REF2 (S403).

When the count value CNT falls within the range of the second reference value REF2 (S403: Y), the health monitoring circuit 125 may continuously count the number of switchings in order to continuously monitor the second health state of the auxiliary power circuit 123 in real time (S401).

When the count value CNT is out of the range of the second reference value REF2 (S403:N), the health monitoring circuit 125 may perform step S115 illustrated in FIG. 8.

Referring to FIG. 8, when the second health state of the auxiliary power circuit 123 is normal (S113: Y), the health monitoring circuit 125 may continuously monitor the second health state of the auxiliary power circuit 123 (S113).

When the second health state of the auxiliary power circuit 123 is abnormal (S113: N), the health monitoring circuit 125 may disable the health monitoring mode HMM and the power save mode PSM and enable the test mode TM (S115).

Then, the health monitoring circuit 125 may check whether the first health state of the auxiliary power circuit 123, that is, the discharging health state is normal (S117). For example, when the time required for the level of the charging voltage VOUT to drop from the level of the preset start voltage Vstart to the level of the stop voltage Vstop is greater than the first reference value REF1, the health monitoring circuit 125 may determine that the first health state of the auxiliary power circuit 123 is normal.

When the first health state of the auxiliary power circuit 123, that is, the discharging health state is abnormal (S117:

N), the health monitoring circuit 125 may allow the PLPIC 100 to operate in the fail mode (S107).

When the first health state of the auxiliary power circuit 123, that is, the discharging health state is normal (S117:Y), the health monitoring circuit 125 may repeat the processes starting at step S109.

As described above, the present technology determines that the supply of power from the auxiliary power circuit 123 is possible when the discharging health state of the auxiliary power circuit 123 is normal, and monitors the charging health state in real time.

When the charging circuit 121 generates energy by the switch M1 switching according to the level of the charging voltage VOUT until the charging voltage VOUT rises from the low target level VL to the high target level VH, the present technology may check in real time whether a failure may have occurred in the auxiliary power circuit 123 according to whether the number of switchings of the switch M1 falls within a set range.

Figure 12:
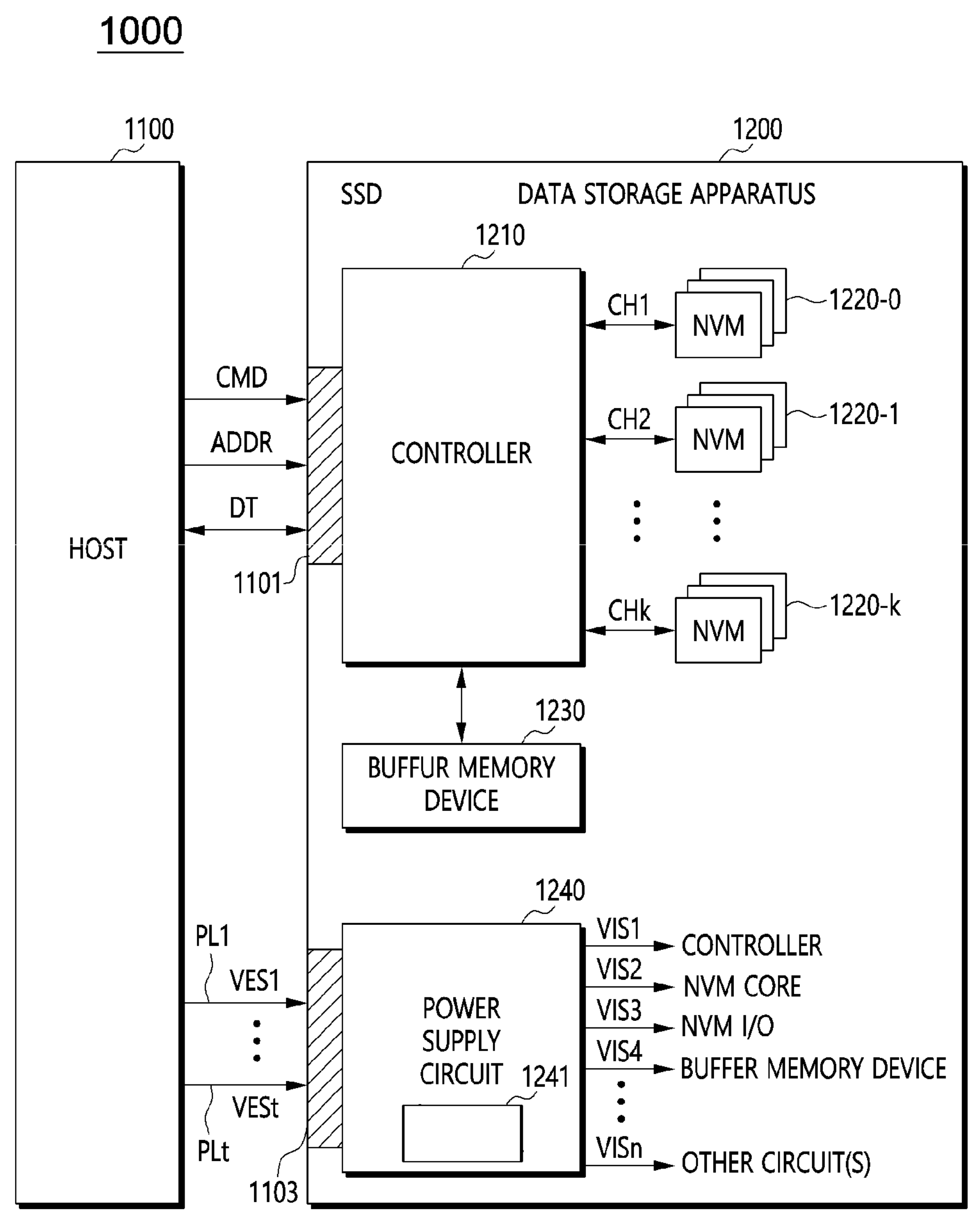
FIG. 12 illustrates a storage system in accordance with an embodiment.

FIG. 12 is a configuration diagram of a storage system 1000 in accordance with an embodiment.

Referring to FIG. 12, the storage system 1000 may include a host device HOST 1100 and a data storage apparatus DATA STORAGE APPARATUS 1200. In an embodiment, the DATA STORAGE APPARATUS 1200 may be configured as a solid state drive (SSD).

The DATA STORAGE APPARATUS 1200 may include a controller CONTROLLER 1210, nonvolatile memory devices NVMs 1220-0 to 1220-*k*, a buffer memory device BUFFER MEMORY DEVICE 1230, a power supply POWER SUPPLY CIRCUIT 1240, a signal connector 1101, and a power connector 1103.

The CONTROLLER 1210 may control an overall operation of the DATA STORAGE APPARATUS 1200. The CONTROLLER 1210 may include a host interface circuit, a control circuit, a random access memory as a working memory, an error correction code (ECC) circuit, and a memory interface circuit, among other circuits.

The DATA STORAGE APPARATUS 1200 receives a command signal CMD and an address signal ADDR from the HOST 1100 through the signal connector 1101, and transmits and receives data DT to and from the HOST 1100. The signal connector 1101 may be configured as various types of connectors according to an interface method between the HOST 1100 and the DATA STORAGE APPARATUS 1200.

The CONTROLLER 1210 may analyze and process a signal inputted from the HOST 1100. The CONTROLLER 1210 may control an operation of background function blocks according to firmware or software for driving the DATA STORAGE APPARATUS 1200.

The BUFFER MEMORY DEVICE 1230 may temporarily store data to be stored in the NVMs 1220-0 to 1220-*k*. Furthermore, the BUFFER MEMORY DEVICE 1230 may temporarily store data read from the NVMs 1220-0 to 1220-*k*. The data temporarily stored in the BUFFER MEMORY DEVICE 1230 may be transmitted to the HOST 1100 or the NVMs 1220-0 to 1220-*k* under the control of the CONTROLLER 1210.

The NVMs 1220-0 to 1220-*k* may be used as storage media of the DATA STORAGE APPARATUS 1200. The NVMs 1220-0 to 1220-*k* may be connected to the CONTROLLER 1210 through a plurality of channels CH0 to CHk, respectively (k is a natural number). One or more NVMs may be connected to one channel. NVMs connected to one channel may be connected to the same signal bus and data bus.

The POWER SUPPLY CIRCUIT 1240 may generate a plurality of internal power supply voltages VIS1 to VISn by converting levels of external power supply voltages VES1 to VESt inputted through the power connector 1103 including a plurality of power lines PL1 to PLt. The plurality of internal power supply voltages VIS1 to VISn generated by the POWER SUPPLY CIRCUIT 1240 may be provided to the CONTROLLER 1210 of the DATA STORAGE APPARATUS 1200, memory cell arrays (NVM Core) and an input/output circuit (NVM I/O) of the NVMs 1220-0 to 1220-*k*, the BUFFER MEMORY DEVICE 1230, and other circuit units. The POWER SUPPLY CIRCUIT 1240 may include an auxiliary power supply 1241, such as the auxiliary power supply apparatus 120 of FIG. 3. When sudden power off occurs, the auxiliary power supply 1241 may supply power so that the DATA STORAGE APPARATUS 1200 may be normally shut down. The auxiliary power supply 1241 may include large capacity capacitors and but is not limited thereto.

The POWER SUPPLY CIRCUIT 1240 may be configured as the power supply apparatus 10 described with reference to FIG. 1 to FIG. 7. The internal voltages VIS1 to VISn generated by the POWER SUPPLY CIRCUIT 1240 may be used as power supply voltages of circuits that receive the internal voltages VIS1 to VISn, respectively.

The power connector 1103 may be configured as various types of connectors according to the power supply method of the HOST 1100.

A person skilled in the art to which the present disclosure pertains can understand that the present disclosure may be carried out in other specific forms without changing its technical spirit or essential features. Therefore, it should be understood that the embodiments described above are illustrative in all respects, not limitative. The scope of the present disclosure is defined by the claims to be described below rather than the detailed description, and it should be construed that the meaning and scope of the claims and all modifications or modified forms derived from the equivalent concept thereof are included in the scope of the present disclosure.

What is claimed is:

1. A power supply apparatus comprising:

a charging circuit configured to receive an external voltage and to generate a charging voltage by charging and discharging energy by switching according to a level of the charging voltage;

an auxiliary power circuit configured to store an electric charge using the charging voltage; and a health monitoring circuit configured to determine a charging health state of the auxiliary power circuit by counting a number of switchings of the charging circuit during an interval in which the charging voltage rises to a first level from a second level, the determined charging health state being based on the number of switchings.

2. The power supply apparatus of claim 1, wherein the charging circuit is configured to generate the charging voltage by charging energy when a switch that operates on the basis of the charging voltage is in a first switching state and discharging the energy when the switch is in a second switching state, and wherein the number of switchings of the charging circuit corresponds to a number of switchings of the switch.

3. The power supply apparatus of claim 1, wherein the health monitoring circuit is configured to:

measure a discharge time required for the charging voltage to drop from a first voltage to a second voltage, and determine a discharging health state of the auxiliary power circuit based on the discharge time.

4. The power supply apparatus of claim 3, wherein the health monitoring circuit is configured to determine the charging health state when the discharging health state of the auxiliary power circuit is determined to be normal.

5. The power supply apparatus of claim 1, wherein the health monitoring circuit is configured to repeat performing the determination of the charging health state in response to determining that the charging health state is normal.

6. The power supply apparatus of claim 1, wherein the health monitoring circuit is configured to, in response to determining that the charging health state is abnormal:

measure a discharge time required for the charging voltage to drop from a first voltage to a second voltage, and determine a discharging health state of the auxiliary power circuit according to the discharge time.

7. The power supply apparatus of claim 6, wherein the health monitoring circuit is configured to repeat performing the determination of the charging health state in response to determining that the discharging health state is normal.

8. A power supply apparatus, comprising:

a power loss protection circuit configured to output operating power by selecting one of a charging voltage and an external voltage;

a power management circuit configured to generate an internal voltage on the basis of the operating power;

a charging circuit configured to receive the external voltage and to generate a charging voltage by charging and discharging energy by switching according to a level of the charging voltage;

an auxiliary power circuit configured to store an electric charge on the basis of the charging voltage; and a health monitoring circuit configured to determine a charging health state of the auxiliary power circuit by counting a number of switchings of the charging circuit during an interval in which the charging voltage reaches a first level from a second level, the determined charging health state being based on the number of switchings.

9. The power supply apparatus of claim 8, wherein the health monitoring circuit is configured to:

measure a discharge time required for the charging voltage to drop from a first voltage to a second voltage, and determine a discharging health state of the auxiliary power circuit based on the discharge time.

10. The power supply apparatus of claim 9, wherein the health monitoring circuit is configured to determine the charging health state when the discharging health state of the auxiliary power circuit is normal.

11. The power supply apparatus of claim 8, wherein the health monitoring circuit is configured to repeat performing the determination of the charging health state in response to determining that the charging health state is normal.

12. The power supply apparatus of claim 8, wherein the health monitoring circuit is configured to, in response to determining that the charging health state is abnormal:

measure a discharge time required for the charging voltage to drop from a first voltage to a second voltage, and determine a discharging health state of the auxiliary power circuit according to the discharge time.

13. The power supply apparatus of claim 12, wherein the health monitoring circuit is configured to repeat performing the determination of the charging health state in response to determining that the discharging health state is normal.

14. A storage system, comprising:

at least one memory apparatus;

a controller configured to exchange data with the memory apparatus in response to an external request; and a power supply apparatus configured to supply the memory apparatus and the controller with an internal voltage generated on the basis of an external voltage, the power supply apparatus including:

a charging circuit configured to receive the external voltage and to generate a charging voltage by charging and discharging energy by switching according to a level of the charging voltage, an auxiliary power circuit configured to store an electric charge on the basis of the charging voltage, and a health monitoring circuit configured to determine a charging health state of the auxiliary power circuit by counting a number of switchings of the charging circuit during an interval in which the charging voltage rises to a first level from a second level, the determined charging health state being based on the number of switchings.

15. The storage system of claim 14, wherein the health monitoring circuit is configured to:

measure a discharge time required for the charging voltage to drop from a first voltage to a second voltage, and determine a discharging health state of the auxiliary power circuit based on the discharge time.

16. The storage system of claim 15, wherein the health monitoring circuit is configured to determine the charging health state when the discharging health state of the auxiliary power circuit is determined to be normal.

17. The storage system of claim 14, wherein the health monitoring circuit is configured to repeat performing the determination of the charging health state in response to determining that the charging health state is normal.

18. The storage system of claim 14, wherein the health monitoring circuit is configured to, in response to determining that the charging health state is abnormal:

measure a discharge time required for the charging voltage to drop from a first voltage to a second voltage, and determine a discharging health state of the auxiliary power circuit.

19. The storage system of claim 18, wherein the health monitoring circuit is configured to repeat performing the determination of the charging health state in response to determining that the discharging health state is normal.

20. A health monitoring method for a power supply apparatus, the health monitoring method comprising:

generating, by a power supply apparatus, a charging voltage by charging and discharging energy by switching according to a level of the charging voltage;

storing an electric charge in an auxiliary power circuit on the basis of the charging voltage; and determining a charging health state of the auxiliary power circuit by counting a number of switchings of the power supply apparatus during an interval in which the charging voltage rises to a first level from a second level, the determined charging health state being based on the number of switchings.

21. The health monitoring method of claim 20, further comprising:

measuring a discharge time required for the charging voltage to drop from a first voltage to a second voltage, and determining a discharging health state of the auxiliary power circuit based on the discharge time.

22. The health monitoring method of claim 21, further comprising:

determining, by the power supply apparatus, the charging health state when the discharging health state of the auxiliary power circuit is normal.

23. The health monitoring method of claim 20, further comprising:

in response to determining that the charging health state is normal, repeating the determination of the charging health state.

24. The health monitoring method of claim 20, further comprising:

in response to determining that the charging health state is abnormal:

measuring, by the power supply apparatus, a discharge time required for the charging voltage to drop from a first voltage to a second voltage, and is determining a discharging health state of the auxiliary power circuit based on the discharge time.

25. The health monitoring method of claim 24, further comprising:

in response to determining that the discharging health state is normal, repeating the determination of the charging health state.

* * * * *